US006771765B1

United States Patent
Crowther et al.

(10) Patent No.: US 6,771,765 B1
(45) Date of Patent: Aug. 3, 2004

(54) MULTIMEDIA QUEUING IN A CUSTOMER CONTACT OR CALL CENTER

(75) Inventors: Jonathan M. Crowther, Sunnyvale, CA (US); Michael P. Montemurro, Toronto (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/474,422

(22) Filed: Dec. 29, 1999

(51) Int. Cl.[7] .............................................. H04M 3/00
(52) U.S. Cl. ........................ 379/265.09; 379/265.12; 379/265.13; 379/266.02
(58) Field of Search ...................... 379/265.09, 265.12, 379/265.13, 266.01, 266.02

(56) References Cited

U.S. PATENT DOCUMENTS

| | | | |
|---|---|---|---|
| 4,510,351 A | | 4/1985 | Costello et al. |
| 5,386,464 A | | 1/1995 | Pruitt |
| 5,450,480 A | | 9/1995 | Man et al. |
| 5,511,116 A | | 4/1996 | Shastry et al. |
| 5,592,542 A | * | 1/1997 | Honda et al. ........... 379/265.11 |
| 5,696,811 A | | 12/1997 | Maloney et al. |
| 5,793,861 A | | 8/1998 | Haigh |
| 5,946,386 A | * | 8/1999 | Rogers et al. ......... 379/265.09 |
| 6,263,066 B1 | * | 7/2001 | Shtivelman et al. ... 379/210.01 |
| 6,356,633 B1 | * | 3/2002 | Armstrong ............. 379/265.04 |
| 6,449,356 B1 | * | 9/2002 | Dezonno ................ 379/265.01 |

FOREIGN PATENT DOCUMENTS

| | | |
|---|---|---|
| EP | 0 856 980 A | 8/1998 |
| EP | 0 954 155 A | 11/1999 |
| WO | WO 99 41720 A | 8/1999 |
| WO | WO 99 65214 A | 12/1999 |

OTHER PUBLICATIONS

"The Call Center Revolution," Technical Paper 3COM, Northeast Consulting, 1997, pps. A, 1–11, "Multimedia Call Centers," pp. 4–5, "Virtual Call Center Requirements," p. 9.

* cited by examiner

Primary Examiner—Ahmad F. Matar
Assistant Examiner—Rasha Al Aubaidi
(74) Attorney, Agent, or Firm—Blakely Sokoloff Taylor & Zafman

(57) ABSTRACT

A method, apparatus, and customer contact or call server that provides a unified queuing mechanism for queuing multiple media requests. The queuing mechanism includes one or more skillsets each including an idle agent queue and a pending requests queue. Skillsets are assigned interrupt levels defining the importance of skillsets with respect to each other. Agents are assigned to and queued in the idle agent queue of one or more of the skillsets. As media requests are received in the pending requests queues of skillsets, agents are dispatched to attend to the requests. As an agent is dispatched from a skillset, it is removed from other skillsets that have an equal or lower interrupt level, and is maintained in skillsets that have a higher interrupt level. Consequently, an agent, tending to a media request, may be interrupted with other media requests only if the other media requests are queued in skillsets of higher interruptibility level, and if the agent is assigned to those other skillsets. Media requests include, among other things, a voice/video call request, an e-mail request, a web form request, and an outbound voice call request.

19 Claims, 8 Drawing Sheets

MULTIMEDIA QUEUING IN A CUSTOMER CONTACT OR CALL CENTER

BACKGROUND OF THE INVENTION

1. Field of the Invention

The present invention relates generally to the field of customer contact or call centers.

2. Background Information

A customer call centers is used by an organization to answer telephone calls regarding sales and services provided by the organization, technical support, and other information. The customer call center includes a number of agents that stand by and provide support on behalf of the organization. Typically, the customer call center receives incoming telephone calls, and queues the calls to one or more groups of agents in the order of receipt and priority using, for example, information about the customer (e.g., caller identification "CLID" signal, information provided in an interactive voice response session, etc.). The agents in the group to which the calls are assigned are presented with the calls, answering them in the order of priority.

With the advent of the Internet, communication has rapidly expanded to on-line e-mails, web forms, and the like. Consequently, organizations have also implemented email servers for handling on-line communications regarding customer support, placement of order, etc. The e-mails and web forms are also replied to by agents of the organization typically on a first-come first-serve and/or priority basis, as, for example, determined automatically by the subject or content of the e-mail or web form.

Each transaction or media type such as voice calls and on-line communications typically has its own queuing mechanism or system, requiring the organization to separately administer the different systems. Moreover, with different systems, the "blending" of transactions becomes more difficult, often leading to poor quality reporting.

Accordingly, it is desirable to provide a method, apparatus, and system that overcomes the aforementioned drawbacks.

SUMMARY OF THE INVENTION

The present invention comprises a method for a server. In one embodiment, the method includes receiving a first contact request of a first source, queuing the first contact request in a pending queue of a first of one or more skillsets, and connecting a first agent assigned to the first skillset to the first source. The method further includes receiving a second contact request of a second source, where the first and second contact requests are of different media requests, queuing the second contact request in the pending queue of a second of the one or more skillsets, and connecting a second agent to the second source.

Other embodiments are described and claimed herein.

DETAILED DESCRIPTION

The present invention comprises a method, apparatus, and customer call server that provides a unified queuing mechanism for queuing multiple media requests.

As discussed herein, a "computer system" or "server" is a product including circuitry capable of processing data. The computer system or server may include, but is not limited or restricted to, a conventional computer (e.g., laptop, desktop, palmtop, server, mainframe, etc.), hard copy equipment (e.g., printer, plotter, scanner, fax machine, etc.), wireless communication equipment, and the like.

Figure 1:
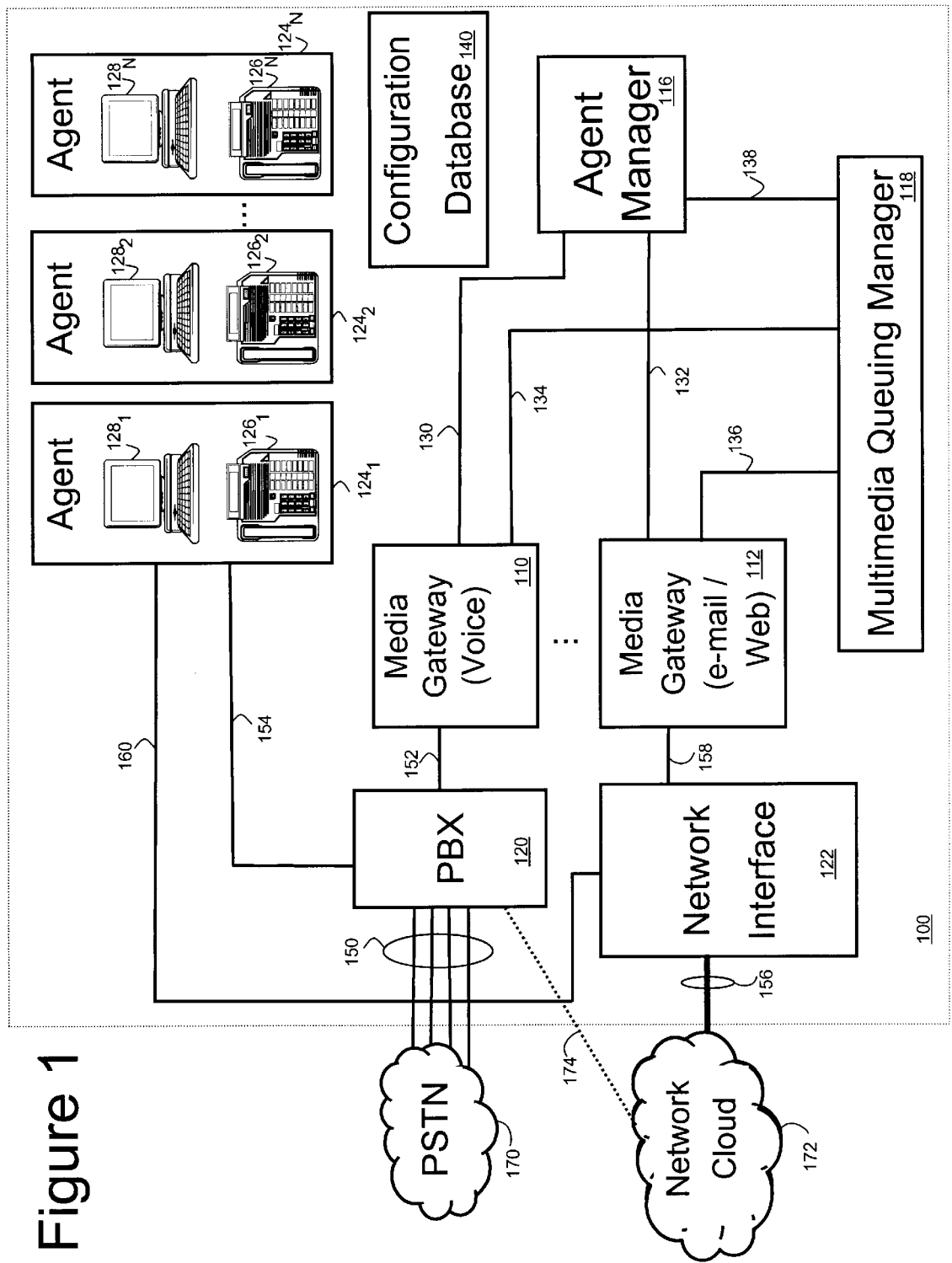
FIG. 1 shows a block diagram of a call center system, according to one embodiment of the present invention.

FIG. 1 shows a block diagram of a call center system 100, according to one embodiment of the present invention. The blocks 110, 112, 116, 118, and 140 are functional blocks, which may be implemented in software and/or hardware. Two or more of such functional blocks may be co-located in a single physical device. For example, the aforementioned blocks may be implemented in software, and located on a computer system having a processor, memory, input/output ports, etc. In another embodiment, the blocks may be implemented on more than one physical device.

As shown in FIG. 1, the call center system 100 includes a plurality of agents $124_1$–$124_N$ ("N" is a positive whole number), where an agent can be a real person, an automated device, etc. An agent may be assigned to one or more skillsets and priority levels within such one or more skillsets. A skillset is broadly defined as a set of one or more skills that an agent possesses. For example, an agent may be trained to answer technical questions about a product line, trained to provide sales support, speak other languages, etc. In one embodiment, to be allocated to a specific skillset an agent must possess all skills required to handle calls in that skillset. It is also contemplated that the agent need not possess all skills in a particular skillset in order to be assigned or allocated to that particular skillset. Agents can be assigned to more than one skillsets. The agent is also assigned a priority level in each skillset so that a supervisor or manager of the call center can ensure that agents are most effectively used, depending on their knowledge and level of training in each skillset.

Agents $124_1$–$124_N$ may have access to respective telephone sets $126_1$–$126_N$ and/or respective computers (or terminals) $128_1$–$128_N$. Thus, at any one time, an agent may only have access to a telephone set, a computer, or both. In the embodiment of FIG. 1, three agents are shown, where each agent has access to both a telephone set and a computer. In one embodiment, a telephone set 126 is used to take voice calls, voice mails, and initiate voice calls, while the computer 128 is used to answer e-mails, take information off web forms and reply, if necessary, answer faxes, etc. In another embodiment, a computer may be used to perform telephonic functions in addition to conventional computer functions.

The telephone sets $126_1$–$126_N$ are coupled to a private branch exchange (PBX) 120 via communication lines 154, and the computers $128_1$–$128_N$ are coupled to a network interface 122 via communication lines 160. The network interface 122 represents a block of one or more physical devices including, among other things, routers, bridges, hubs, servers (e.g., e-mail server, web/content server, etc.), firewall, etc., and combinations thereof. The call center system 100 may be internally connected in a local area network (LAN), wide area network (WAN), etc., or combinations thereof. The PBX 120 is coupled to a public switch telephone network (PSTN) 170 via trunk lines 150. The network interface 122 is coupled to a network cloud 172 (e.g., Internet) via communication lines 156. The network cloud 172 may include any type of network that can transport packets and/or cells of information (e.g., signaling commands and media) thereacross. Exemplary networks include, but are not limited or restricted to, Transmission Control Protocol/Internet protocol (TCP/IP), frame relay, asynchronous transfer mode (ATM), and X.25 networks. In one embodiment, one or more of the telephone sets $126_1$–$126_N$ may be Internet Protocol (IP) compatible telephone sets. The PBX 120 may optionally receive and/or initiate telephone calls over the network cloud 172 (e.g., IP calls), as shown by dashed lines 174.

Continuing to refer to FIG. 1, the PBX 120 is coupled to a media gateway 110 via communication lines 152 and the network interface 122 is coupled to a media gateway 112 via communication lines 158. Media gateway 110 is used for, among other things, connecting voice calls to and outgoing voice calls from agents. In one embodiment, the connection of the voice call to agents is physically controlled by the PBX 120. The PBX 120 notifies the media gateway 110 of the incoming voice call via messages transmitted over communication lines 152. It is to be noted that the protocol of the messaging between functional blocks within the system 100 is not critical to the teachings of the present invention.

The media gateway 112 is responsible for detecting receipt of e-mails, web forms, etc., and displaying the e-mails, web forms, etc. on the computers $128_1$–$128_N$. Thus, for example, on an incoming e-mail, the media gateway 112 displays the e-mail on one of the computers 128 to allow an agent to respond. The incoming e-mails and/or web forms may be stored in media gateway 112 or on a separate server that is in communication with the media gateway 112.

It is to be noted that many media gateways may be used in the system 100, and, for that matter, more than one media gateway may be used for controlling telephone sets. Thus, one media gateway may be used to connect voice calls to a first set of one or more telephone sets, while a second media gateway may be used to connect voice calls to a second set of one or more voice calls. There may be a media gateway for outbound voice dialing where voice and/or pre-recorded calls are placed (e.g., for telemarketing). A further media gateway may be implemented to control IP voice calls coming in and out (e.g., NetMeeting™).

The media gateways 110 and 112 are coupled to an agent manager 116 via communication lines 130 and 132, respectively, and a multimedia queuing manager (MQM) 118 via communication lines 134 and 136, respectively. The agent manager 116 is a centralized functional block that is aware of the capabilities and status of the agents. The agent manager 116 knows, among other things, the type of media and skillsets that agents can handle (e.g., voice calls, e-mails, web forms, etc.). For example, if an agent only logs in from a telephone set, then the agent can answer voice calls and initiate outgoing calls, but cannot respond to e-mails or web forms. If the agent logs in from a telephone and a computer or a computer having telephonic capabilities, then the agent can perform all of the aforementioned actions. This information is detected when the agent logs in.

The MQM 118 queues the incoming media request (e.g., voice call request, e-mail request, etc.) in a common queuing structure without necessarily knowing the type of media that is being queued. In one embodiment, the MQM 118 queues incoming media requests into one or more skillsets. When agents becomes available, the agent manager 116 notifies the MQM 118 by sending a message including agent IDs via communication lines 138. The MQM 118 queues the available agents in the skillset(s) that the agents are assigned to. If an agent becomes available in a skillset that has a pending media request, or a pending media request comes into a skillset that has an available agent, the MQM 118 sends a message to one of the media gateways (e.g., 110 or 112) indicating the agent (e.g., using the agent ID) that is to handle the pending media request.

The system 100 further includes a configuration database 140, which includes information about agents including the configured skillset(s) that the agents belong/assigned to, the priority level assigned to agents, etc. Thus, once an agent logs in with a user ID and password, the agent manager 116 performs a lookup in the configuration database 140 to obtain information about the agent. Additionally, the configuration database 140 includes a list of skillsets and associated interrupt levels. The interrupt level of a skillset defines the importance of that skillset with respect to other skillset, as will be described below. Skillsets may be created or destroyed dynamically. The MQM 118 also has access to the configuration database 140 to obtain the skillsets. In one embodiment, when no agent is logged into a skillset, that skillset is referred to as an out-of service skillset, and cannot queue a media/pending request.

Figure 2:
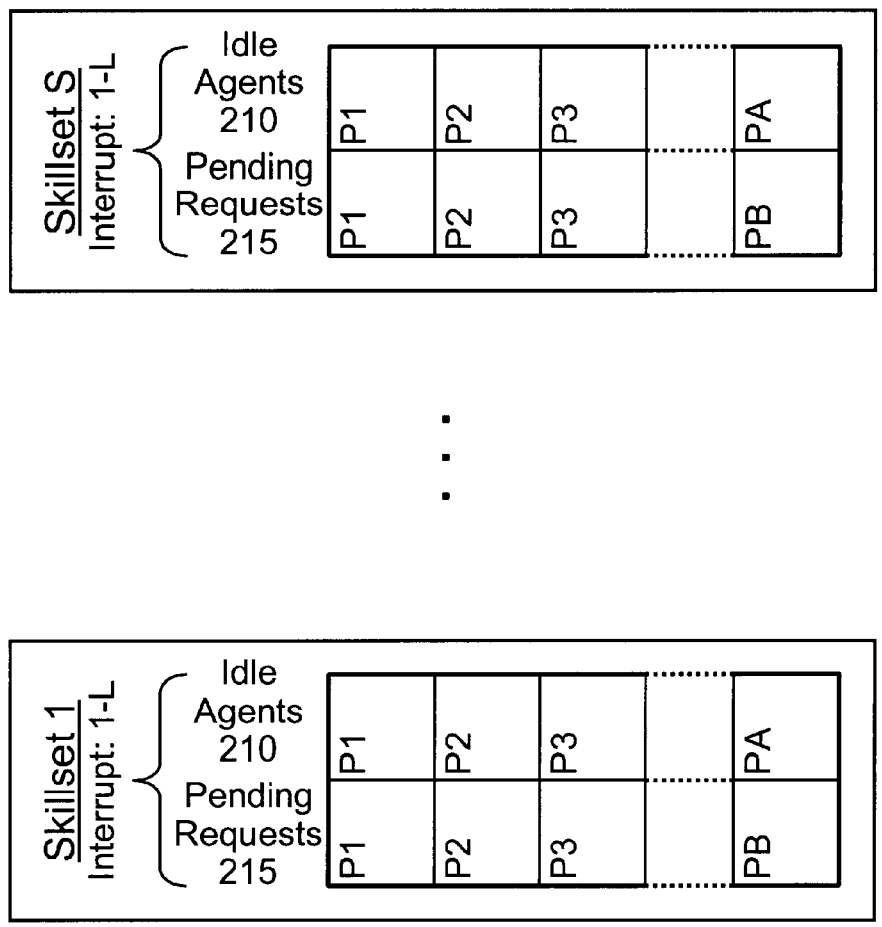
FIG. 2 illustrates the queuing structure of the multimedia queuing manager, according to one embodiment of the present invention.

FIG. 2 illustrates the queuing structure of the multimedia queuing manager 118, according to one embodiment of the present invention. Referring to FIG. 2, the queuing structure includes one or more skillsets, labeled as Skillset 1 to Skillset S, where "S" is a positive whole number. For example, technical support may be assigned two skillsets, a voice call skillset and an e-mail skillset. Similarly, the sales department may be assigned skillsets such as a voice skillset and a miscellaneous skillset (e-mail, web forms, etc.). At startup, the MQM 118 reads the configuration database 140 to determine the skillsets that are available for the call center system 100, and establishes the skillsets in memory.

In one embodiment, each skillset includes two queues, namely, an idle agent queue 210 and a pending requests queue 215. Within the idle agent queue 210 are priority levels P1 to PA, and within the pending requests queue 215 are priority levels P1 to PB (where "A" and "B" are positive whole numbers, and where "A" and "B" may be different). In the embodiments described herein, priority level P1 is defined as the highest priority level, though in other embodiments, priority levels may be defined differently. The idle agent queue 210 lists the agents that are idle and the priority level assigned to the agents. The priority levels are pre-defined and stored in the configuration database 140. The priority level might define the training level of the agent in the particular skillset, or any other criteria that the supervisors/managers determine for their call center. The pending requests queue 215 contains the pending requests (e.g., voice calls, e-mails, web forms, etc.) at particular priority levels that are waiting to be answered by agents.

In one embodiment, an idle agent and a pending request cannot coexist in a skillset at the same time. The priority level of an agent and a pending request may be changed dynamically. In the case of agents, the change in priority level in a skillset is performed through the configuration database 140. This change automatically propagates to the MQM 118, which moves the agent to the new priority. In the case of pending requests, there is a message that can be sent from the associated media gateway to the MQM at any time to adjust the priority request without removing the same from the queue.

Each skillset is also assigned an interruptibility level, which is from 1 to L (where "L" is a positive whole number). The interrupt level defines the importance of skillsets and whether agents assigned to a skillset may be interrupted while busy answering other requests. The highest level of interruptibility is defined as level 1, meaning that requests being handled by agents from skillsets at this level cannot be interrupted by requests in skillsets at lower levels of interruptibility.

The MQM 118 provides an interface which allows other functional blocks such as, for example, the agent manager 116, media gateways (e.g., 110 and 112), etc. to query the MQM 118 about state information. State information includes media requests that are pending in a pending requests queue of one or more skillsets, a list of all calls currently in the MQM 118, a list of all idle agents, etc.

At system startup, each media gateway in the system 100 sends an initialization message to the agent manager 116 indicating to the agent manager 116 of its existence. The initialization message optionally includes information including, among other things, the type of media supported, the devices controlled (e.g., telephone sets, computers, etc.), and the like. Alternatively, media gateways may dynamically send messages to the agent manager 116 identifying the devices controlled, as agents log in. Furthermore, each media gateway sends a message to the MQM 118 to indicate its existence for subsequently sending the MQM media requests for queuing. The media gateway 110 also sends a message to the PBX 120 indicating the telephone sets that the media gateway 110 is controlling. Additionally, the media gateway 112 sends messages to the agent manager 116 and the MQM 118, respectively, to notify the agent manager and the MQM of its existence. When agents login to computers or terminals, the computer client is pre-loaded with software that knows how to find the media gateway 112 (e.g., usually by an IP address and port number). The computer then establishes a link with the media gateway 112 at agent login time. The agent information is retrieved from the configuration database 140 (either directly by each media gateway, or indirectly through the agent manager 116).

In the call center system agents log in and out dynamically. In the case where the agent has both a computer and a telephone, the agent only logs in once (e.g., from the computer). At the computer, the agent sends a login message (e.g., user ID and password) to the network interface 122, which forwards the message to the media gateway 112. The media gateway 112 registers the agent as a valid agent, and sends a message to the agent manager 116. The agent manager 116 looks up in the configuration database 140 and determines that the agent also has a telephone set for receiving and initiating voice calls. Consequently, the agent manager 116 notifies the media gateway 110 that the agent is also logged into the telephone set. The media gateway 110, after registering the agent as a valid agent to take voice calls, sends a message to the PBX 120 to notify it that the gateway is handling the particular telephone set. The PBX 120 then forwards a message back to the telephone set via communication lines 154 to update the display on the telephone set, indicating to the agent that the agent is logged in. Meanwhile, the agent manager 116 sends a message to the MQM 118 to indicate that the agent is logged in and the skillset(s) the agent is to be logged into. The agent manager 116 may decide not to inform the MQM 118 of the agent login at this point in time if the agent profile in the configuration database indicates that the agent should remain in a "not ready" state at login. In this case, the agent manager 116 only tells the MQM 118 after the agent indicates that the agent is "ready" (e.g., using the telephone or computer to change the state). Thus, agents may have a "not ready" state in which they are logged in, but are not ready to take calls, e-mails, etc. In this case, the agents are not placed in the skillset idle agent queues. In one embodiment, the agent sends a ready/not ready message to the media gateway, which passes on the message to the agent manager 116. The agent manager then sends a ready/not ready message to the MQM 118. For example, after login or after a call is completed, the agent may automatically be "not ready" for a fixed period of time to wrap up any paperwork, etc. after each call.

Figure 3:
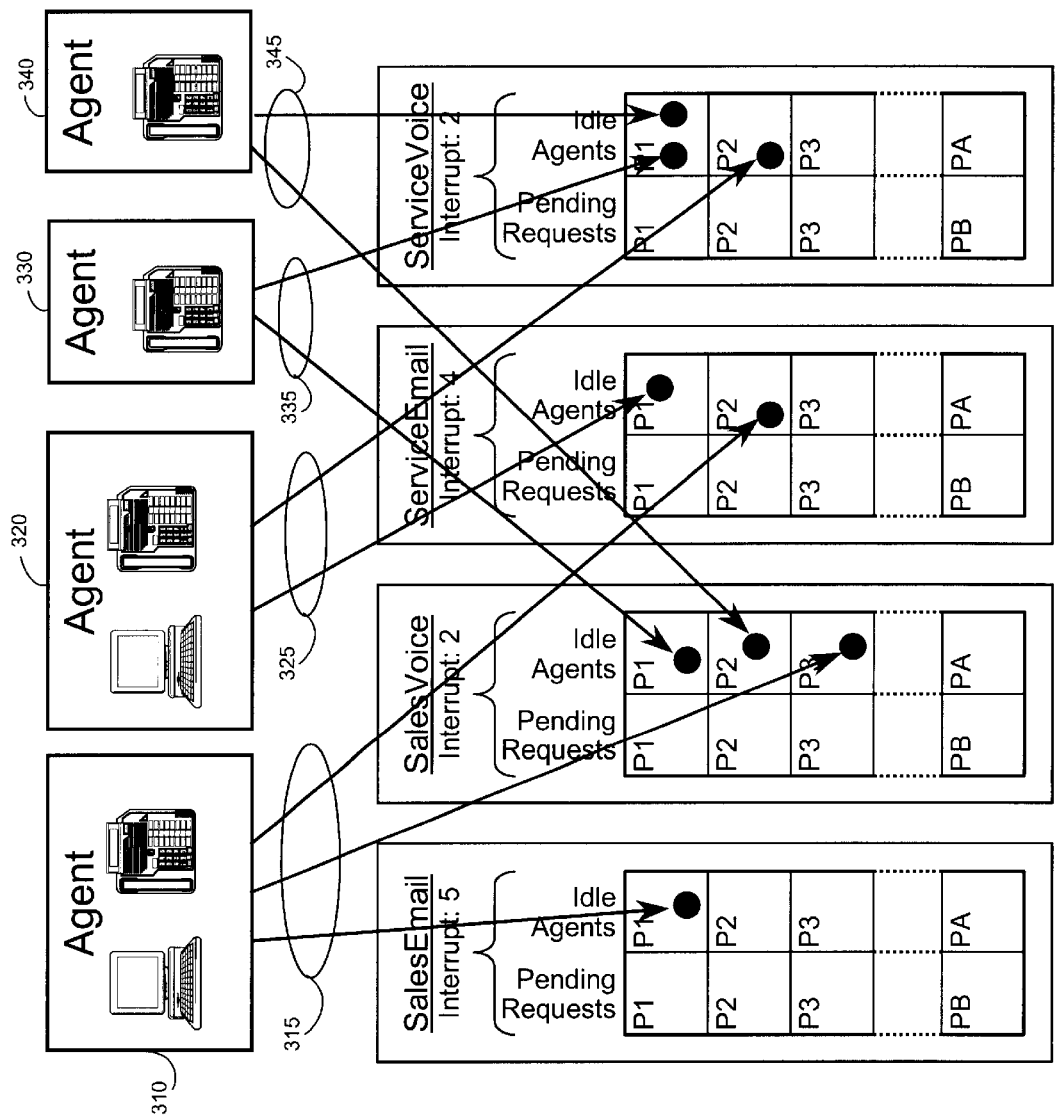
FIG. 3 illustrates skillset assignment of agents in the queuing structure of the multimedia queuing manager, according to an exemplary embodiment of the present invention.

FIG. 3 illustrates skillset assignment of agents in the queuing structure of the multimedia queuing manager 118, according to an exemplary embodiment of the present invention. In the embodiment of FIG. 3, four skillsets are defined, namely, a sales e-mail skillset having an interrupt level of 5, a sales voice skillset having an interrupt level of 2, a service e-mail skillset having an interrupt level of 4, and a service voice skillset having an interrupt level of 2. FIG. 3 also shows four agents (310, 320, 330, and 340) that are assigned to the skillset(s) at login. The agents can log in and log out at any time. Agents 310 and 320 log in from a computer and a telephone set, while agents 320 and 330 only login from a telephone set. When an agent logs in, the agent manger 116 obtains the agent's configuration information including the skillsets that the agent belongs to, the priority level assigned to the agent for the skillset(s), etc. from the configuration database 140. The agent manager 116 then sends an agent idle message to the MQM 118, which includes, among other things, the configuration information obtained from the configuration database 140. The MQM 118 then assigns the agent to one or more skillsets at the appropriate priority levels based on this configuration information. In a system in which an agent can be logged in but at a "not ready" state, the agent manager 116 will delay this message until the time when the agent becomes "ready." The MQM 118, therefore, only places agents in the skillsets' idle agent queues when the agent is both logged in and ready to accept calls/requests.

In this exemplary embodiment, agent 310 is logged into sales e-mail, sales voice, and service email skillsets at respective priority levels P1, P3, and P2, as shown by numeral 315. Agent 320 is logged into service e-mail and service voice skillsets at priority levels P1 and P2 (numeral 325), agent 330 is logged into the sales voice and service voice skillsets at priority level P1 (numeral 335), and agent 340 is also logged into the sales voice and service voice skillsets at priority levels P1 and P2 (numeral 345).

Figure 4:
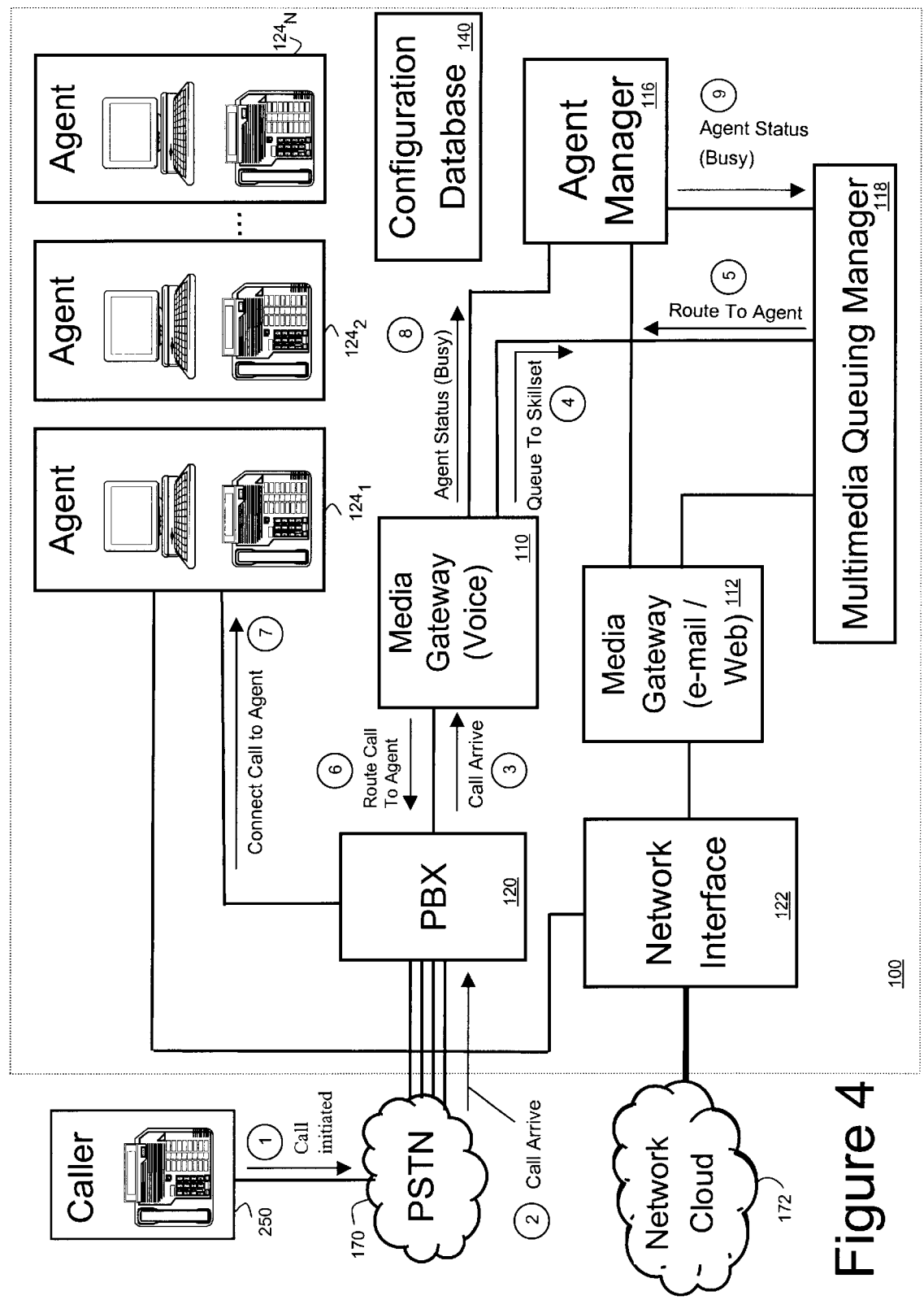
FIG. 4 shows a block diagram of the call center server of FIG. 1 handling an incoming voice call, according to one embodiment of the present invention.

FIG. 4 shows a block diagram of the call center server of FIG. 1 handling an incoming voice call, according to one embodiment of the present invention. Components equivalent to those in FIG. 1 are represented by same numbers.

Referring to FIG. 4, a telephone call is initiated by a caller 250 over the PSTN 170 (reference 1). The incoming telephone call arrives at the PBX 120, as shown by reference 2. The PBX 120 then sends a control message to media gateway 110 indicating that a telephone call has arrived (reference 3). The PBX 120 may navigate the caller 250 through one or more menus, play background music, etc. This may be done either by the PBX 120 on its own, or by the media gateway 110 instructing the PBX what treatments to give the caller while waiting. In the meantime, the media gateway 110 sends a queue to skillset message (reference 4) to the MQM 118 to queue the telephone call in a specific skillset. The media gateway 110 will know the skillset(s) to place the call into based on reading the configuration database 140. There may be other criterion(ria) by which to choose the skillset(s) to place the telephone call into. This could be based on, for example, the caller's number (e.g., CLID), the 800 number used to call into the system 100, the number entered by the caller 250 during a voice menu (customer number, social security number, etc.), and the like.

The MQM 118 queues the request for the voice call in a queue until an agent in the specific skillset is available. Once an agent is available in that skillset, the MQM 118 sends a route to agent message back to the media gateway 110 identifying the agent (e.g., using an agent ID) to connect the call to (reference 5). The MQM 118 does not necessarily need to know how to connect the call to the agent. It can rely on the media gateway 110 for the connection. The media gateway 110 sends a route call to agent message to the PBX 120 (reference 6). The PBX 120 physically connects the incoming telephone call of the caller 250 with the agent based on the agent's current phone set, which the media gateway knows dynamically due to the agent login sequence described earlier (reference 7). The media gateway 110 sends an agent busy message to the agent manager 116 to indicate that the agent is now busy (reference 8). The agent manager 116 then forwards an agent busy message to the MQM 118 (reference 9). The agent busy message may optionally include a busy level value, which indicates the interruptibility level of the agent. The agent manager 116 may alter (increase or decrease) the interruptibility level of a skillset using this message. The MQM 118 removes the agent from the idle agent queues of all skillsets of equal or lower interruptibility to prevent other calls getting to the agent while the agent is busy. The agent can be interrupted only if a request is queued in a skillset of higher interruptibility level (and only if this agent is assigned to that skillset). In another embodiment, the agent may be interrupted if a request is queued in a skillset of an equal or higher interruptibility level.

The telephone call is completed if either the caller 250 or the agent handling the call disconnects. Once the call is completed, the PBX 120 sends a call disconnect message to the media gateway 110, which then informs the agent manager 116 that the agents status is now idle. The agent manager 116 passes the agent idle status to the MQM 118, which puts the agent back into the idle agents queue 210 of one or more skillsets.

Figure 5:
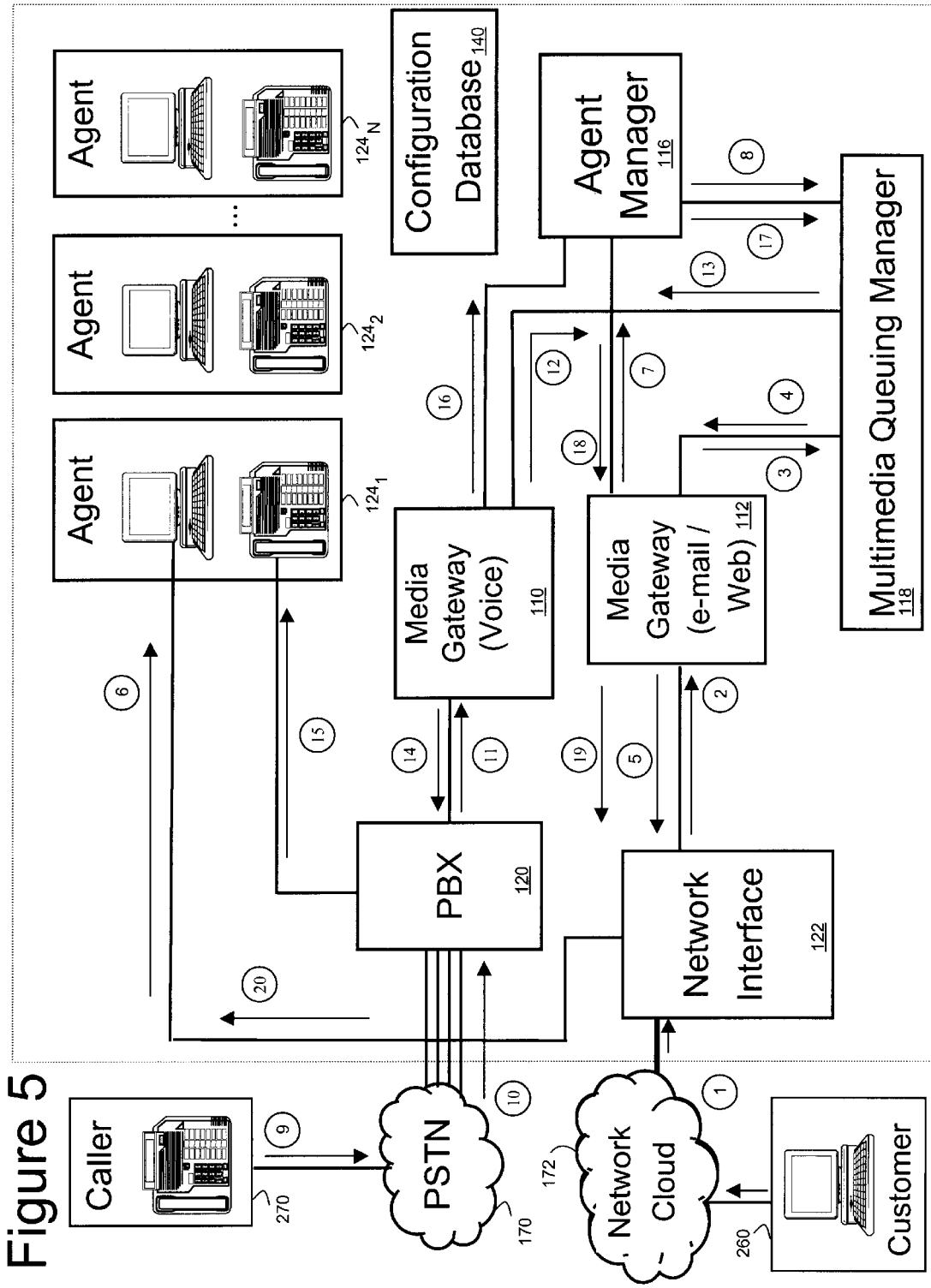
FIG. 5 is a block diagram of the call center server of FIG. 1 showing a technique according to another embodiment of the present invention.

FIG. 5 is a block diagram of the call center server of FIG. 1 showing a technique according to another embodiment of the present invention. Referring to FIG. 5, a user 260 (e.g., customer) sends an e-mail over the network cloud 172 to the network interface 122 (reference 1). The network interface 122 then notifies the media gateway 112 of the received e-mail (reference 2). The media gateway 112 sends a message to the MQM 118 to queue the e-mail to a skillset (reference 3). In one embodiment, the skillset that the e-mail is queued into depends on the address that the e-mail was received on, the originator of the e-mail (e.g., corporate officer), etc. For example, if the e-mail is received at a technical support address, then the e-mail is queued to a technical support skillset. The MQM 118 sends a message back to the media gateway 112, when an agent is available to answer the e-mail (reference 4). Once the route to agent message is received from the MQM 118, the media gateway 112 causes the e-mail to be displayed on the agent's monitor (references 5 and 6). The media gateway 112 sends an agent busy message to the agent manager 116 to indicate that the agent is now busy (reference 7). The agent manager 116 then forwards an agent busy message to the MQM 118 (reference 8). The agent busy message optionally includes a busy level value, indicating the interruptibility level of the agent, which may be changed dynamically by the agent manager 116. Consequently, the MQM 118 removes the agent from the skillset idle agent queues for all skillsets of equal or lower interruptibility level. The agent can be interrupted only if a request is queued in a skillset of higher interruptibility level and only if this agent is assigned to that skillset. In one embodiment, the interruptibility level of an e-mail is lower than for a voice call. That is to say, a voice call may interrupt an e-mail reply (in progress by an agent), as will be seen next.

While the agent is responding to the e-mail, a telephone call initiated by a caller 270 arrives at the PBX 120 (references 9 and 10). As before, the PBX 120 sends a control message to media gateway 110 indicating that a telephone call has arrived (reference 11). The media gateway 110 sends a queue to skillset message (reference 12) to the MQM 118, which has a higher interruptibility level than the queue to skillset message for the e-mail (reference 12). Assuming that the agent was assigned to both the e-mail and voice call skillsets, and this agent is the highest priority and longest idle in the voice call skillset (or no other agents are available), the MQM 118 sends a route to agent message back to the media gateway 110 identifying the same agent that is currently responding to the e-mail (reference 13). In response, the media gateway 110 sends a route call to agent message to the PBX 120 (reference 14), which physically connects the incoming telephone call of the caller 320 with the agent responding to the e-mail (reference 15). The media gateway 110 also sends an agent busy message to the agent manager 116 (reference 16). The agent manager 116 knows that the agent was already busy (from reference 7 above), but now is busy with a higher interruptibility level. Consequently, the agent manager 116 sends an agent busy message to the MQM 118 with the higher interruptibility level (reference 17). The MQM 118 then raises the interruptibility level. The agent manager 116 also sends a notify agent busy message to the media gateway 112 to notify it that the agent, which was handling the email, is now busy on a more important task (reference 18). The media gateway 112 then optionally disables or hides the e-mail on the agent's display (references 19 and 20).

Once the voice call is complete, the media gateway 110 sends an idle agent status message to the agent manager 116, which the sends a busy message to the MQM 118, lowering the interruptibility level for the e-mail. The agent manager 116 also sends a message to the media gateway 112 to restore the e-mail. The media gateway 112 then restores the e-mail back on the agent's display. Once a response to the e-mail is completed and sent out, the media gateway 112 sends an agent idle message to the agent manager 116. The agent manager forwards the agent idle message to the MQM 118, which puts the agent back into the idle agents queue in the one or more skillsets.

Figure 6:
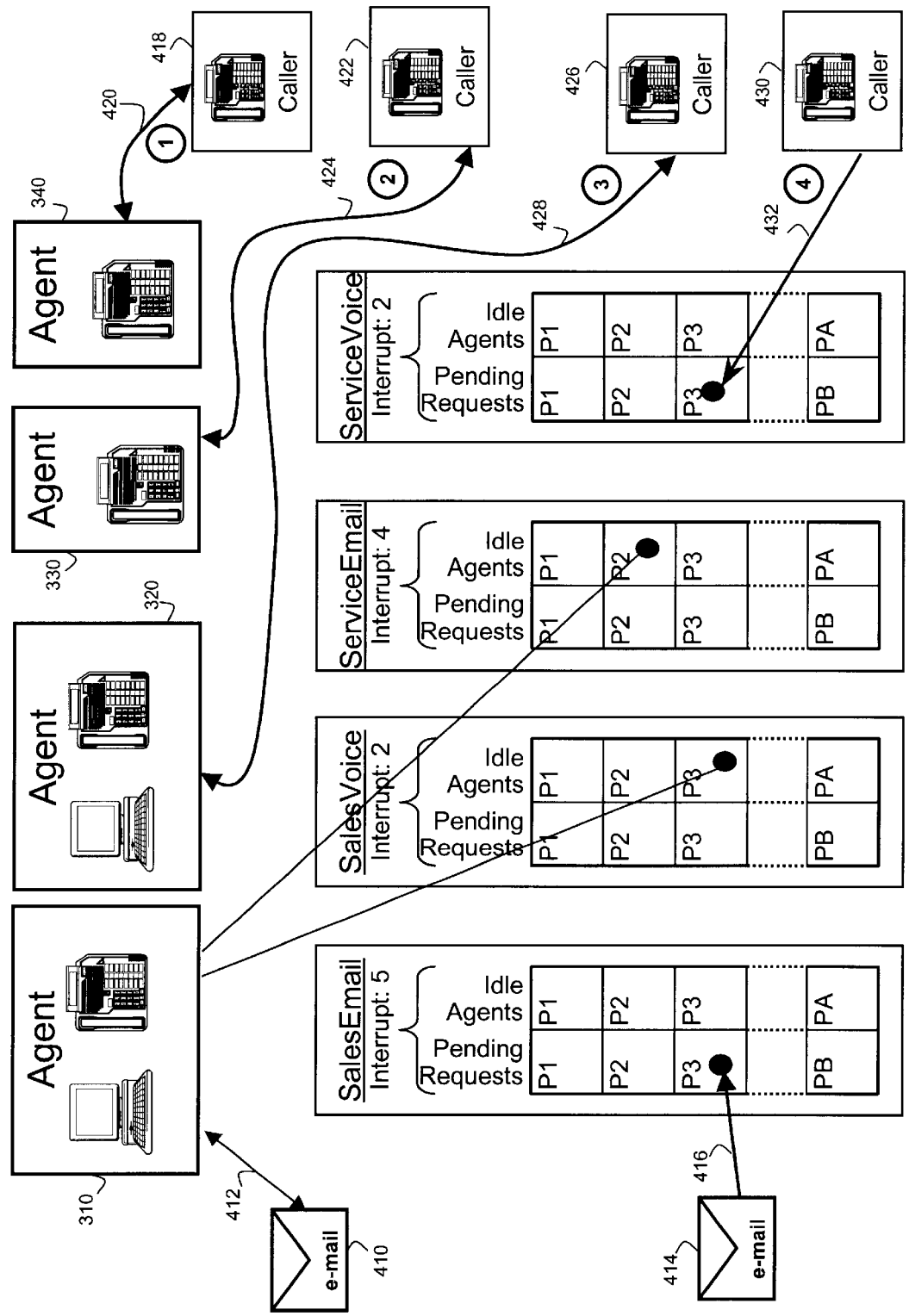
FIGS. 6 through 8 illustrate the queuing mechanism of the multimedia queuing manager with respect to an exemplary scenario.
Figure 7:
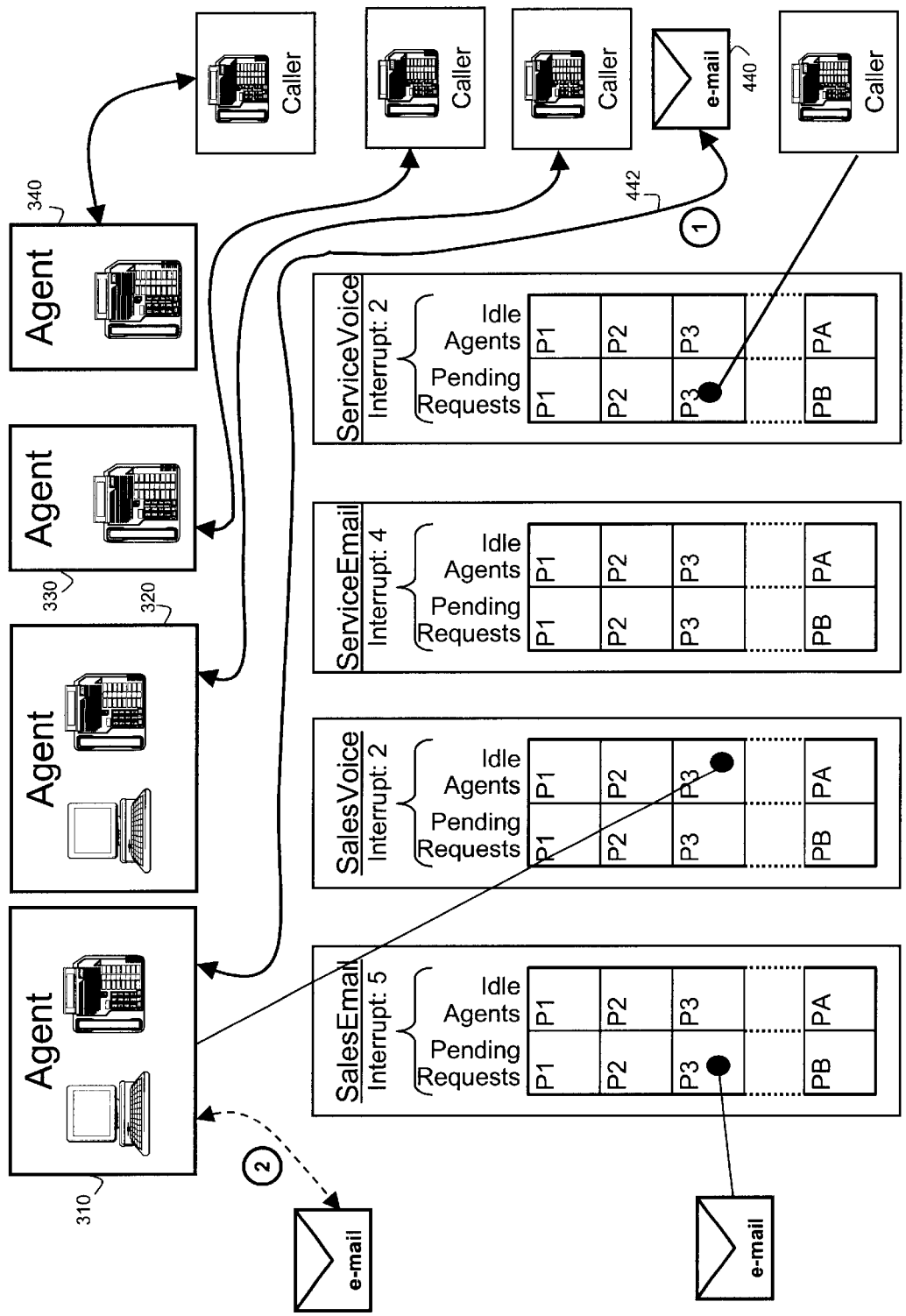
Figure 8:
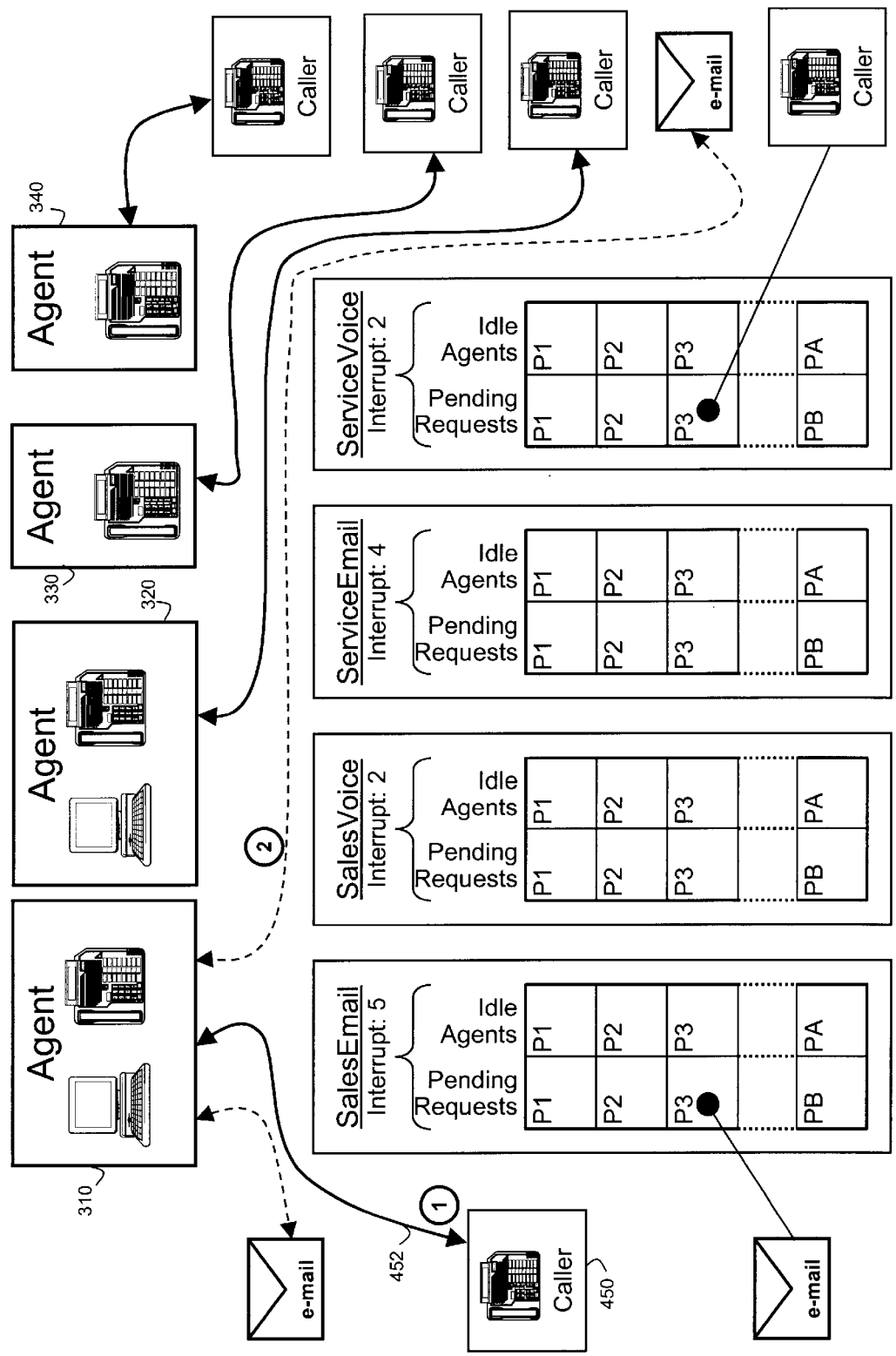

FIGS. 6 through 8 illustrate the queuing mechanism of the multimedia queuing manager 118 with respect to an exemplary scenario. In this exemplary scenario, the skillset assignment of agents is based on the embodiment of FIG. 3.

Referring first to FIGS. 3 and 6, a first e-mail request 410 is placed in the sales e-mail skillset at a priority level (not shown). Since agent 310 is idle in the sales e-mail skillset (see FIG. 3), the e-mail is sent to agent 310 for a reply, as shown by arrow 412. In one embodiment, when an agent is selected to answer a media request, the agent is maintained in other skillsets, if any, where the agent has a higher interruptibility level. It is contemplated that the agent may be maintained in other skillsets where the agent has an equal or higher interruptibility level. In any event, since agent 310 had an interrupt level of 5 in the sales e-mail skillset, agent 310 is maintained in the sales voice and service e-mail skillsets because agent 310 is at higher interrupt levels (interrupt level 2 for sales voice skillset and interrupt level 4 for service e-mail skillset).

A second e-mail request 414 is received and placed at P3 in the sales e-mail skillset as shown by arrow 416. The assignment of the priority level (in this case P3) for a media request is controlled by the media gateways (e.g., media gateway 112). For example, an e-mail request from a registered customer may be assigned a higher priority level than an e-mail request from an unregistered user. The media gateway 112 specifies to the MQM, by messaging, which skillset(s) to place the e-mail request (see FIG. 5, message at reference 3). The media gateway 112 may optionally queue the request to multiple skillsets. It is also up to the media gateway to know the skillsets that are set up for e-mail, whether the skillsets are for sales or service, etc.

Thereafter, a voice call 418 request is received for the service voice skillset where three agents are idle. The idle agent with the highest priority level is connected to the incoming voice call. In this case, two agents are at priority level 1, and one of them is selected (e.g., agent 340), as determined by the idle time of these agents. As a result, agent 340 is connected to the voice call, as shown by arrow 420. Agent 340 is then removed from the sales voice skillset because it is not at a higher interrupt level. A second voice call request 422 is then received at the service voice skillset. The MQM 118 connects agent 330 to the second voice call, as shown by arrow 424. Agent 330 is also removed from the sales voice skillset because it is not at a higher interrupt level. A third voice call request 426 is received at the service voice skillset, and the agent 320 is connected to the third call, as shown by arrow 428. Agent 320 is removed from the service e-mail skillset because the interrupt level is lower at the service e-mail skillset. A fourth call request 430 is received at the service voice skillset. Since no idle agents exist at the service voice skillset, the request is placed in the pending requests queue at P3 (arrow 432), as selected by the media gateway 110.

Referring also now to FIG. 7, an e-mail request 440 is received at the service e-mail skillset. Agent 310 is idle in this skillset, even though agent 310 is replying to e-mail (FIG. 6, arrow 412). Consequently, agent 310 is connected to the e-mail for reply, as shown by arrow 442. Agent 310 is put on hold with respect to the reply to e-mail, as shown by dashed lines 412. Agent 310 is still in the sales voice skillset because it has a higher interrupt level in that skillset.

Referring also now to FIG. 8, a further voice call request 450 is received at the sales voice skillset. Since agent 310 is available at this skillset, agent 310 is connected to the voice call, as shown by arrow 452. Further, the second e-mail that agent 310 was replying to is also put on hold (dashed lines) in addition to the first e-mail that is on hold. Once the voice call 450 is completed, the agent 310 returns to replying the e-mail 442 since no other request are pending having a higher interrupt level, and is also placed back into the idle agent queue of the sales voice skillset (by the agent manager 116 which informs MQM 118 of the new level, as per reference 17 of FIG. 5). Once agent 310 is done replying to e-mail 442, agent 310 returns to responding to e-mail 410, and is also placed back into the idle agent queue of the service e-mail skillset (by the agent manager 116 which again informs MQM 118 of the new level). Once agent 310 is done replying to e-mail 410, agent 310 becomes idle and is placed back into the idle agent queue of the sales voice skillset.

The present invention may be embodied in one of several forms including a method, apparatus, system, program product in a computer processor readable medium, and data signal embodied in a carrier wave. When implemented in software, the elements of the present invention are essentially the code segments to perform the necessary tasks. The program or code segments can be stored in a processor readable medium or transmitted by a computer data signal embodied in a carrier wave over a transmission medium or communication link. The "processor readable medium" may include any medium that can store or transfer information. Examples of the processor readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method for routing a plurality of contact requests in a call center, the method comprising:

receiving a first contact request from a first source;

queuing the first contact request in a pending queue of a first skillset having a first interrupt level;

connecting a first agent selected from a first plurality of agents assigned to the first skillset to the first source; and maintaining the first agent as a valid agent in a second plurality of agents assigned to a second skillset having a second interrupt level, the second interrupt level indicating that agents may be interrupted to handle contact requests assigned the second interrupt level while busy handling contact requests assigned the first interrupt level.

2. The method of claim 1 wherein the first and second skillsets include different media requests.

3. The method of claim 1 wherein the first and second skillsets are e-mail and voice call skillsets, respectively.

4. The method of claim 1 further comprising:

removing the first agent as a valid agent from a third plurality of agents assigned to a third skillset having a third interrupt level, the third interrupt level indicating that agents may not be interrupted to handle contact requests assigned the third interrupt level while busy handling contact requests assigned the first interrupt level.

5. The method of claim 1 further comprising:

receiving a second contact request from a second source;

queuing the second contact request in a pending queue of the second skillset;

putting on hold the connection of the first agent and the first source;

connecting the first agent assigned to the second skillset to the second source; and connecting the first agent back to the first source when the connection between the first agent and the second source is terminated.

6. A queuing method for routing a plurality of contact requests in a call center, the method comprising:

receiving a contact request from a source;

queuing the contact request in a first skillset having a first interrupt level;

connecting an agent selected from a first plurality of agents assigned to the first skillset to the source; and maintaining the agent as a valid agent in a second plurality of agents assigned to a second skillset having a second interrupt level, the second interrupt level indicating that agents may be interrupted to handle contact requests assigned the second interrupt level while busy handling contact requests assigned the first interrupt level.

7. The queuing method of claim 6 further comprising:

removing the agent as a valid agent from a third plurality of agents assigned to a third skillset having a third interrupt level, the third interrupt level indicating that agents may not be interrupted to handle contact requests assigned the third interrupt level while busy handling contact requests assigned the first interrupt level.

8. The queuing method of claim 6 further comprising:

receiving a second contact request from a second source;

queuing the second contact request in the second skillset;

causing the agent to hold the first source;

connecting the agent to the second source.

9. The queuing method of claim 8 further comprising:

connecting the agent back to the first source when the connection between the agent and the second source is completed;

adding the agent as a valid agent in the second skillset; and adding the agent as a valid agent in the first skillset when the connection between the agent and the first source is completed.

10. The queuing method of claim 6 wherein the first and second skillsets include different media requests.

11. A computer program product, comprising:

a computer usable medium having computer readable program code embodied therein to route a plurality of contact requests in a call center;

computer readable program code to queue the contact request in a first skillset having a first interrupt level;

computer readable program code to connect an agent selected from a first plurality of agents assigned to the first skillset to the source; and computer readable program code to maintain the agent as a valid agent in a second plurality of agents assigned to a second skillset having a second interrupt level, the second interrupt level indicating that agents may be interrupted to handle contact requests assigned the second interrupt level while busy handling contact requests assigned the first interrupt level.

12. The computer program product of claim 11 further comprising:

computer readable program code to remove the agent as a valid agent from a third plurality of agents assigned to a third skillset having a third interrupt level, the third interrupt level indicating that agents may not be interrupted to handle contact requests assigned the third interrupt level while busy handling contact requests assigned the first interrupt level.

13. The computer program product of claim 11 further comprising:

computer readable program code to receive a second contact request from a second source;

computer readable program code to queue the second contact request in the second skillset;

computer readable program code to cause the agent to hold the first source; and computer readable program code to connect the agent to the second source.

14. The computer program product of claim 13 further comprising:

computer readable program code to connect the agent back to the first source when the connection between the agent and the second source is terminated;

computer readable program code to add the agent as a valid agent in the second skillset; and computer readable program code to add the agent as a valid agent in the first skillset when the connection between the agent and the first source is completed.

15. The computer program product of claim 11 wherein the first and second skillsets include different media requests.

16. A call center system for plurality of contact request, the system comprising:

a queuing manager to queue the plurality of contact requests, the contact requests being associated with one of a first skillset and a second skillset;

a configuration database that comprises information pertaining to each of a plurality of agents and each of a plurality of skillsets, the information comprises a list of one or more skillsets assigned to each of the plurality of agents, and a list of skillsets and associated interrupt levels; and an agent manager in communication with the queuing manager and the configuration database, wherein the agent manager, the configuration database and the queuing manager collectively
  (i) receive a contact request from a source,
  (ii) queue the contact request in a first skillset having a first interrupt level,
  (iii) connect an agent of the plurality of agents assigned to the first skillset to the source, and
  (iv) maintain the connected agent as a valid agent in a second skillset having a second interrupt level if the connected agent is also assigned to second skillset, the second interrupt level indicating that connected agents may be interrupt to handle contact requests assigned the second interrupt level while busy handling contact requests assigned the first interrupt level.

17. The call center system of claim 16, wherein the agent manager, the configuration database and the queuing manager collectively operate to remove the connected agent as a valid agent from a third skillset having a third interrupt level, the third interrupt level indicating that connected agents may not be interrupted to handle contact request assigned the third interrupt level while busy handling contact requests assigned the first interrupt level.

18. The call center system of claim 16, wherein the agent manager, the configuration database and the queuing manager further collectively operate to:

receive a second contact request from a second source;

queue the second contact request in the second skillset;

cause the agent to hold the first source; and connect the agent to the second source.

19. The call center system of claim 16, wherein the agent manager, the configuration database and the queuing manager further collectively operate to:

connect the agent back to the first source when the connection between the agent and the second source is terminated;

add the agent as a valid agent in the second skillset; and add the agent as a valid agent in the first skillset when the connection between the agent and the first source is completed.

* * * * *